United States Patent [19]
Murata et al.

[11] Patent Number: 5,265,436
[45] Date of Patent: Nov. 30, 1993

[54] CONTROL APPARATUS FOR AIR-CONDITIONERS

[75] Inventors: Hirotaka Murata, Tatebayashi; Kazunori Matsumoto, Ota; Mitsuo Okazaki, Ashikaga; Keiji Nishida, Gunma; Katsumi Saito, Ota, all of Japan

[73] Assignee: Sanyo Electric Co., Ltd., Osaka, Japan

[21] Appl. No.: 959,601

[22] Filed: Oct. 13, 1992

[30] Foreign Application Priority Data

Nov. 18, 1991 [JP] Japan .................................. 3-302019

[51] Int. Cl.$^5$ ................................................ F25B 7/00
[52] U.S. Cl. ........................................ 62/175; 165/22; 236/1 EA
[58] Field of Search .............. 62/175, 510; 236/1 EA; 165/22

[56] References Cited

U.S. PATENT DOCUMENTS 2,336,671 12/1943 Chambers ............................ 62/175
4,876,859 10/1989 Kitamoto ............................ 62/175

FOREIGN PATENT DOCUMENTS 3-59351 3/1991 Japan .

Primary Examiner—William E. Wayner
Attorney, Agent, or Firm—Wenderoth, Lind & Ponack

[57] ABSTRACT

Multi-purpose indoor units and multi-purpose outdoor units are parallel-connected with each other by refrigerant pipes, and an operating capacity is obtained on the basis of the sum of the demanded capacities of the indoor units and on the basis of the compressor type and maximum capacity of the outdoor units using a control apparatus.

11 Claims, 16 Drawing Sheets

FIG. 4

| OUTDOOR UNITS | TYPE | MIN CAPACITY | MAX CAPACITY |
|---|---|---|---|
| (i) | INVERTER | min(i) | max(i) |
| (ii) | ON/OFF | min(ii) | max(ii) |
| (iii) | ON/OFF | min(iii) | max(iii) |

CONTROL APPARATUS FOR AIR-CONDITIONERS

The present invention relates to an air-conditioner, and more particularly, to a control apparatus for an air-conditioner in which a plurality of outdoor units form a refrigerating cycle of a single system with respect to a plurality of indoor units, the control apparatus being used to allot the total desired capacity of the indoor units to the outdoor units.

The conventional air-conditioner having indoor units is disclosed in, for example, Japanese Patent Publication (Unexamined) No. 3-59351/1991. The air-conditioner disclosed in this publication has a plurality of indoor units, and a single outdoor unit, which includes a single heat source-side heat exchanger, a compressor with variable operating capacity, and a compressor powered by a commercial power source and capable of selectively switching on (maximum capacity) or off. These two compressors are combined to increase the range of variation of the operating capacity of the outdoor unit.

The operating capacity of this outdoor unit is set to the total demand of the indoor units. At the same time, the degrees of opening of the flow rate variable valves are set so that a refrigerant is supplied to the room-side heat exchangers in the indoor units in accordance with the demanded capacity thereof.

In the conventional air-conditioner described above, the sum of the allowable capacity of the allowable capacities of the indoor units and the outdoor unit have to be equalized. Namely, when the operating capacity of the outdoor unit is smaller than the sum of the allowable capacity of the indoor units, the operation of the outdoor unit is unable to satisfactory correspond to the demanded capacity of the indoor units. Especially, when the operation of the air-conditioner is started, the capacity of the outdoor unit becomes short, and it takes a long period of time before the room temperature reaches a set level.

When the operating capacity of the outdoor unit is larger than the sum of the allowable capacity of the indoor unit, the capacity exceeding the sum of the allowable capacity is not demanded, so that the capacity of the outdoor unit becomes excessive.

Therefore, the indoor units to be combined with the outdoor unit are usually determined in advance. Under the circumstances, when indoor units each having an optimum allowable capacity are provided in the object rooms to be air-conditioned, an outdoor unit to be combined optimally therewith becomes unavailable in many cases.

Especially, when the capacity of the outdoor unit becomes large, the range of the capacity thereof also becomes large, for example, 20 horsepower and 10 horsepower, and it is difficult to select an optimum outdoor unit. The range of the capacity of the outdoor unit may therefore be set smaller but, in such a case, a plurality of outdoor units of different capacity are required, with the result that the universality of an outdoor unit is thus very low.

SUMMARY OF THE INVENTION

An object of the present invention is to provide an air-conditioner which can obtain desired maximum capacity by a combination of a plurality of outdoor units.

The present invention provides a control apparatus for an air-conditioner in which a plurality of indoor units each of which has a room-side heat exchanger, an expansion device and a refrigerant flow rate variable valve, and a plurality of outdoor units each of which has a heat source-side heat exchanger and a compressor, are parallel-connected to two refrigerant pipes to form a refrigerating cycle. The control apparatus allots the total desired capacity of the indoor units, corresponding to a load relative to the indoor units difference between a room temperature and a desired temperature, or the degrees of opening of the flow rate variable valves, to the outdoor units on the basis of maximum capacity of the compressor/compressors in each of the outdoor units and the alteration range of the capacity thereof.

In the control apparatus thus constructed for an air-conditioner, a plurality of outdoor units can be used selectively so that the operating capacity of the outdoor units agrees with, or is higher than, the sum of the allowable capacities of the indoor units.

In general, an air-conditioner provided with a single outdoor unit with respect to a plurality of indoor units has such a construction as is described presently, and the allowable capacity of the indoor units is around 1-2 horsepower. Accordingly, the sum of the allowable capacities of the indoor units is set with a range of variation of around 2 horsepower.

The maximum capacity of the outdoor units are generally set to 5, 6, 8 and 10 horsepower, so that the total maximum capacity of the outdoor units can be set correspondingly to the sum of the allowable capacities of the indoor units by suitably selecting the outdoor units to be used.

If in such a case the total desired capacity of the indoor units is allotted by a control apparatus as a setting capacity to the outdoor units, the operation of the outdoor units is not concentrated on a single outdoor unit, and an air-conditioning operation of a capacity corresponding to the desired capacity of the indoor units can be carried out.

BRIEF DESCRIPTION OF THE DRAWINGS

FIG. 4 is a diagram showing a capacity of outdoor units.

PREFERRED EMBODIMENTS OF THE INVENTION

Figure 1:
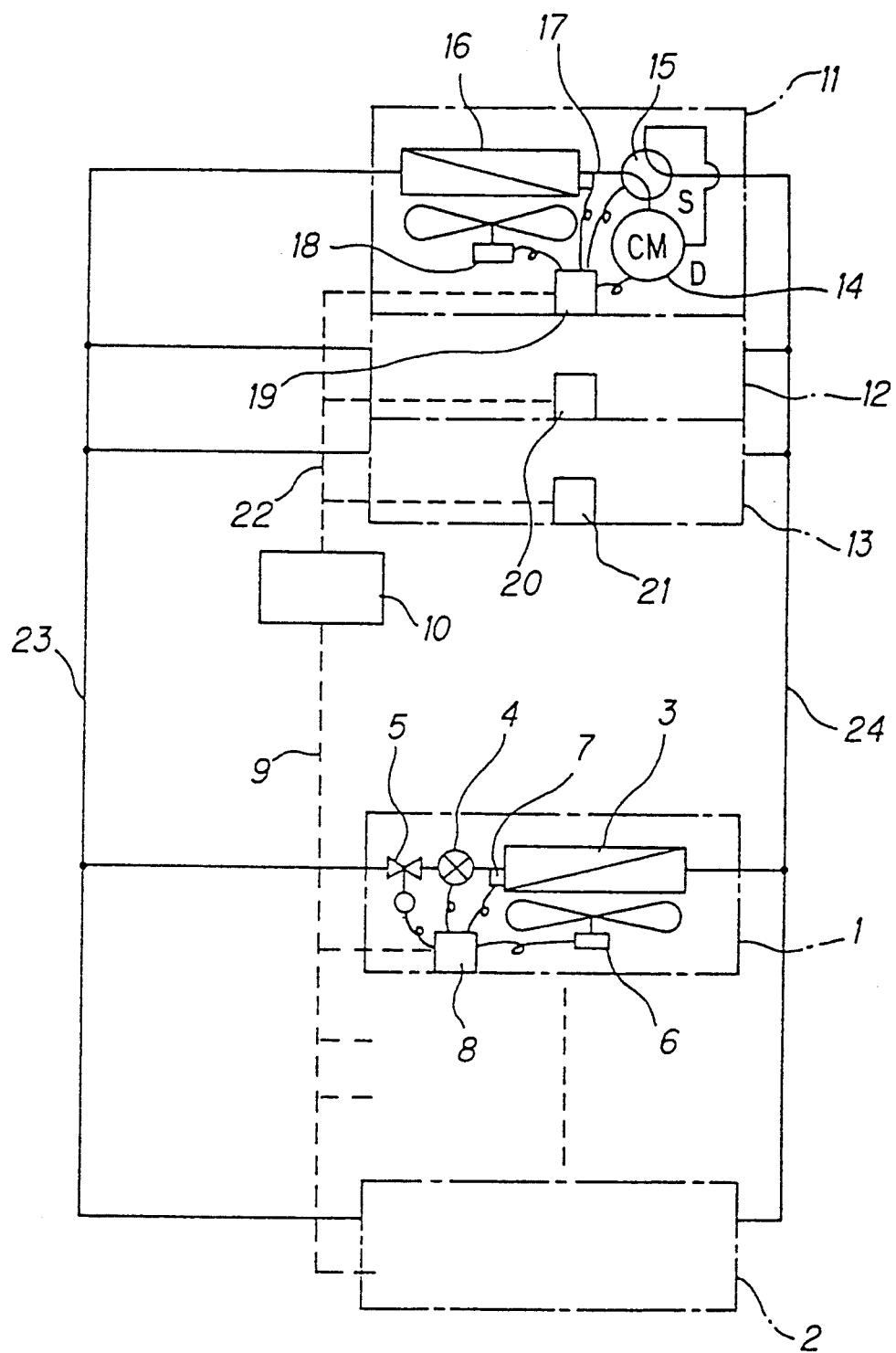
FIG. 1 is a diagram of a refrigerant circuit for an air-conditioner embodying the present invention.

An embodiment of the present invention will now be described with reference to the drawing. In FIG. 1 showing a diagram of an air-conditioner, a required number of indoor units 1, 2 are provided in a room to be air-conditioned. The allowable capacity of the indoor units is 1 horsepower, for example, in the indoor unit 1, and 2 horsepower in the indoor unit 2. The indoor unit 1 has a room-side heat exchanger 3, an expansion device, for example an electronic expansion valve 4 for varying the pressure reducing rate, a flow rate control valve 5 for varying the quantity of a refrigerant flowing through the room-side heat exchanger 3, a blower 6 for use in supplying to a room to be air-conditioned the conditioning air cooled or heated in the room-side heat exchanger 3, a detector 7 for detecting the temperature in the room-side heat exchanger 3, and a room-side controller 8 for controlling the operations of these parts.

The room-side controller 8 is adapted calculate a required capacity which is balanced with a refrigeration load (not higher than maximum allowable capacity) on the basis of a difference between the temperature in the room to be air-conditioned and a set temperature, and to control the opening degree of the flow rate control valves 5 so that a flow rate of refrigerant corresponding to this required capacity is attained. The controller 8 controls at the same time the flow rate of the air sent by the blower 6, in accordance with the described temperature difference. This flow rate of the air is controlled by varying the number of revolutions per minute of an electric motor in the blower 6. The pressure reducing rate of the electric expansion valve 4 is controlled so that the temperature in the room-side heat exchanger 3 is kept constant.

The room-side controller 8 is adapted to output a signal to a control apparatus 10 through a signal line 9. This signal includes operating/stopping data, room cooling/heating data, maximum allowable capacity data and demanded capacity data on the indoor unit 1, temperature data on the room-side heat exchanger 3, and abnormality data used for keeping the indoor unit safe when an abnormality occurs.

The other indoor units including the indoor unit 2 have a similar construction, and a detailed description thereof will therefore be omitted. In this connection, there are some indoor units having an allowable capacity of which is different from that of the others.

With reference to outdoor units 11-13, the outdoor unit 11 has a compress or 14 such as a rotary refrigerant compressor, the operating capacity of which is varied from 0 to 5 horsepower by an inverter device for changing rotation thereof, a four-way valve 15, which is in the condition of a cooling operation in FIG. 1, for changing the flow of a refrigerant when a room cooling operation is switched to a room heating operation, and vice versa, a heat source-side heat exchanger 16, a detector 17 for detecting the temperature in the heat source-side heat exchanger 16, a blower 18 for flowing air to the heat source-side heat exchanger 16, and an outdoor controller 19 for controlling the operations of these parts.

The outdoor controller 19 controls the capacity of the compressor 14 on the basis of a signal applied thereto from the control apparatus 10 through a signal line 22 to switch the four-way valve 15 to a room cooling/heating mode and change the flow rate of the air sent by the blower 18, on the basis of the temperature detected by the temperature detector 17 or the temperature of the outside air. This controller 19 also controls a defrosting operation when the heat source-side heat exchanger 16 is frosted during a room heating operation, and a protection operation when an overload occurs.

A signal which the outdoor controller 19 in the outdoor unit 11 receives from the control apparatus 10 includes room cooling/heating data and operating capacity setting data. When the operating capacity setting data are "0", this signal serves as a compressor stopping signal to stop the operation of the compressor.

The outdoor units 12, 13 also have a similar construction and similar outdoor controllers 20, 21, and a detailed description thereof if therefore omitted except for the following. The outdoor unit 12 has two compressors, i.e. a compressor with a changeable operating capacity of 0-5 horsepower, and a compressor switchable between off and 5 horsepower having a maximum operating capacity of 5 horsepower and a variation range of operation of 5 horsepower, so that a combined operation of these two compressors enables the operating capacity thereof to be varied between 0-10 horsepower. The outdoor unit 13 has a compress switchable between off and 10 horsepower having maximum capacity of 10 horsepower and a variation range of operation of 10 horsepower. Accordingly, if the outdoor units 11-13 are used, a total operating capacity can be varied to 0-20 horsepower. In this embodiment, eight indoor units each having allowable capacity of 2 horsepower and four indoor units each having allowable capacity of 1 horsepower are connected together.

These indoor units 1, 2 and outdoor units 11-13 are parallel-connected with refrigerant pipes 23, 24 to form a single refrigerating cycle. Therefore, the four-way valves, such as the four-way valve 15, in the outdoor units 11-13 are always set in the same operating mode (room cooling operation/room heating operation), and all the indoor units are placed in the same operating mode.

The control apparatus 10 serves to output a signal to the indoor units 1, 2 through the signal line 9, and receive signals from the outdoor units 11-13 through a signal line 22. The signal outputted to the indoor units consists of data as to whether at least one outdoor unit is operated or not, data showing that the units are in a room cooling operation/room heating operation, data showing that the outdoor units are in a defrosting operation, data showing that the air-conditioner is abnormally stopped and data showing that an oil recovery operation is carried out. The signal outputted from the outdoor units includes data on the temperature in the heat source-side heat exchanger 16, data on the maximum capacity of the outdoor unit and discrimination data (inverter, inverter+ON/OFF, and ON/OFF) on the compressor provided in the apparatus, in addition to the above-described data.

When the operation of the air-conditioner is started, a main function of the indoor units is to exchange data with the control apparatus 10 and judge whether the refrigerant cycle is of a room cooling operation/room heating operation. When a practical operating mode agrees with the operation mode set by the user, a demanded capacity is calculated on the basis of a difference between a set temperature and room temperature, and data on the demanded capacity are sent to the control apparatus 10. At the same time, the flow rate regulating valve 5 is opened at a predetermined speed, which is set so that it agrees with the increased speed of the capacity of the outdoor units, to start an air-conditioning operation.

When the operating mode set by the user and that of the refrigerating cycle do not agree with each other, the disagreement of operating modes is displayed to so inform the user. The operating mode of the refrigerating cycle is set to the operating mode of an indoor unit to which an operation starting signal was sent first in the state that the indoor units were all stopped. This operating mode setting operation may be carried out not by an indoor unit but by a switch additionally provided on the control apparatus 10.

A main operation of the outdoor units 11–13 is to carry out an operation based on the data represented by a signal outputted from the control apparatus 10. The outdoor units also carry out through the outdoor controllers 8 the controlling of the temperature in the room-side heat exchanger 3, excess current, high and low pressures and a defrosting operation. These controlling operations are carried out ordinarily by the outdoor units, and have little relation with the scope of the present invention. Therefore, a description of these control operations is omitted.

Figure 2:
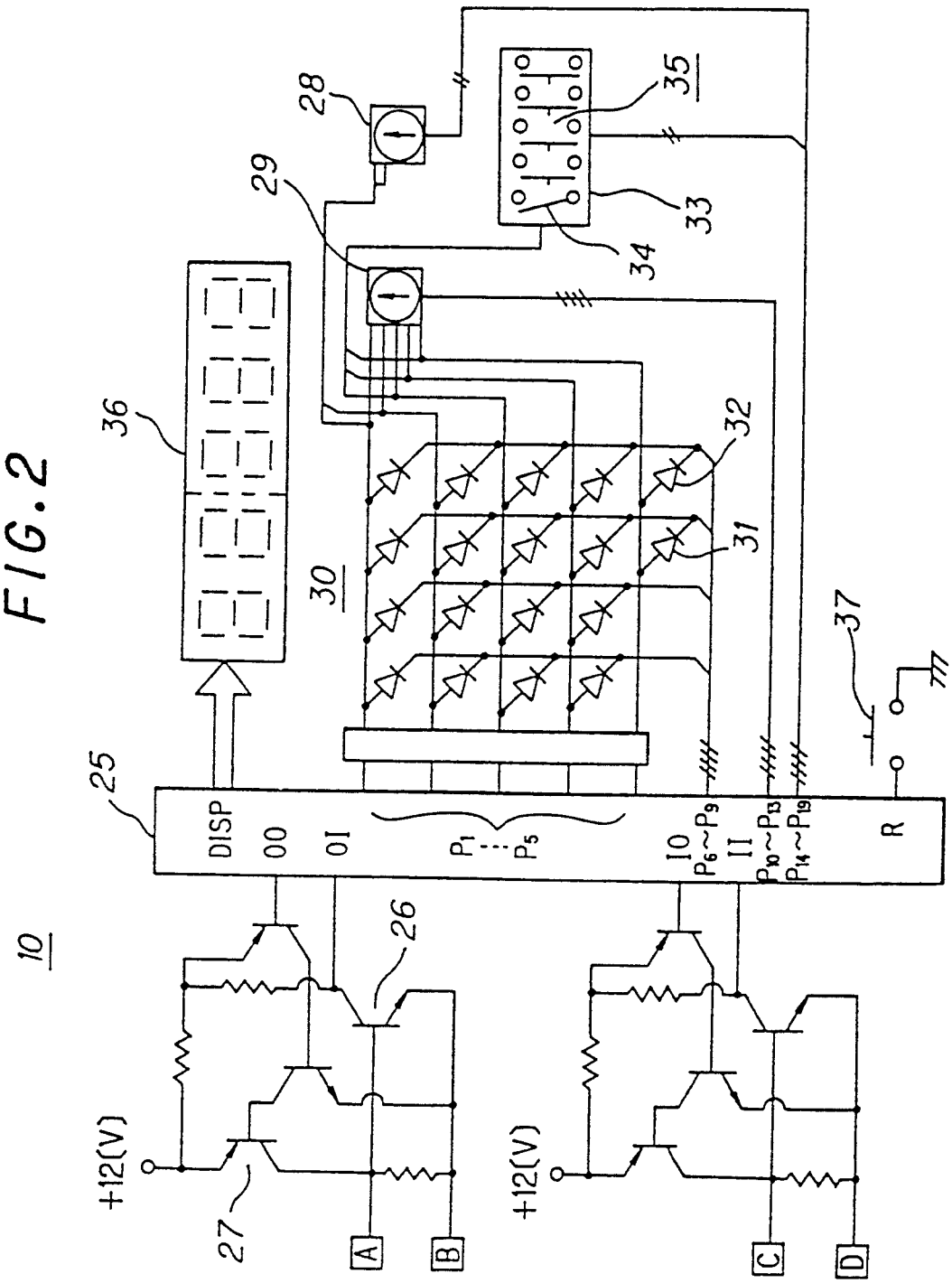
FIG. 2 is an electric circuit diagram of a principal portion of a control apparatus shown in FIG. 1.

FIG. 2 is an electric circuit diagram of a principal portion of the control apparatus 10. A microcomputer 25 is provided to carry out computation and a controlling operation based on inputted data. The terminals A and B are signal input terminals to which the outdoor controllers 19–21 are connected through the signal line 22. A transistor 26 is provided to apply a reception signal to a terminal OI of the microcomputer 25 in response to the level (H/L voltage) of a signal applied to a base terminal thereof. A transistor 27 receives a signal from a terminal OO of the micropcomputer 25, which has been amplified by a transistor in a precedent stage. The output from the transistor 27 is applied to the terminals A and B. The signal used between the microcomputer 25 and outdoor controllers 11–13 is a PCM signal, which includes destination address DA, source address SA, and data. Accordingly, if the address of the microcomputer 25 is "0", those of the outdoor controllers (indoor units) are "1", "2" and "3". These addresses are set by the switches on the outdoor controllers 19–21 so as not to be duplicated. An outdoor units's number setting switch 28 (gray code output switch) is provided to set values of "1" to "3" (in this embodiment, a maximum number of the outdoor units to be connected is set to 3). The values set by this switch 28 are scanned at the terminals P0–P5 of the microcomputer 25 and the terminals P14, P15. When these set values and the number of kind of the source address SA of a signal practically inputted from the terminals A and B do not agree, words indicative of the occurrence of an abnormality are is displayed to demand the resumption of an address setting operation.

The terminals C and D are signal input terminals, which are connected to the indoor controllers through the signal line 9. The signals inputted from the terminals C and D are applied to a terminal II of the microcomputer 25 in the same manner as described above, and a signal outputted from a terminal IO of the microcomputer 25 is outputted similarly to the terminals C and D. The addresses of the indoor units are set in the same manner to "1" to "16" (a maximum number of the indoor units to be connected is set to 16), and the number of indoor units to be connected is set in a number setting switch 29. Accordingly, when the number of the kind of source address and the value set by the switch 29 do not agree, words indicative of the occurrence of abnormality are displayed in the same manner as in the case of the outdoor units. The setting of the address of the indoor units may be done automatically.

A reference numeral 30 represents light-emitting elements, which correspond to the indoor units These light-emitting elements have thereon numbers representing the addresses of the indoor units. These sixteen light-emitting elements are adapted to be lit dynamically by the terminals P1–P4, P6–P9 of the microcomputer 25. The light-emitting elements 31, 32 are adapted to display an operation of an air-conditioner and the occurrence of abnormality therein, and they are lit dynamically at once. The operation display element is lit when at least one outdoor unit is operated.

A switch unit 33 includes a room cooling operation/room heating operation setting switch 34 (when this switch is effective, a room cooling operation/room heating operation can be set by this switch alone, and, when this switch is ineffective, this operation can be set by the indoor units alone), and other switches 35 include a switch which outputs an operation starting signal/operation stopping signal to all of the indoor units, a switch for changing the data (temperature in the room-side heat exchanger and room temperature) to be shown on a digital display unit 36, and a switch for changing the address to be displayed of an indoor unit. When the microcomputer 25 judges that these switches 35 are operated, it outputs a signal to the indoor units to obtain data thereon.

The display unit 36 has seven 5-digit segments, and the digits in two upper (i.e., left side) positions represent the address of an indoor unit, while the digits in the three lower (i.e., right side) positions represent data, such as temperatures. The segments of this display units are lit dynamically by the microcomputer 25.

A reset switch 37 is provided to reset the microcomputer and start a control operation. The reset switch 37 connects the indoor and outdoor units together and is operated after the switches 28 and 29 are set.

Figure 3:
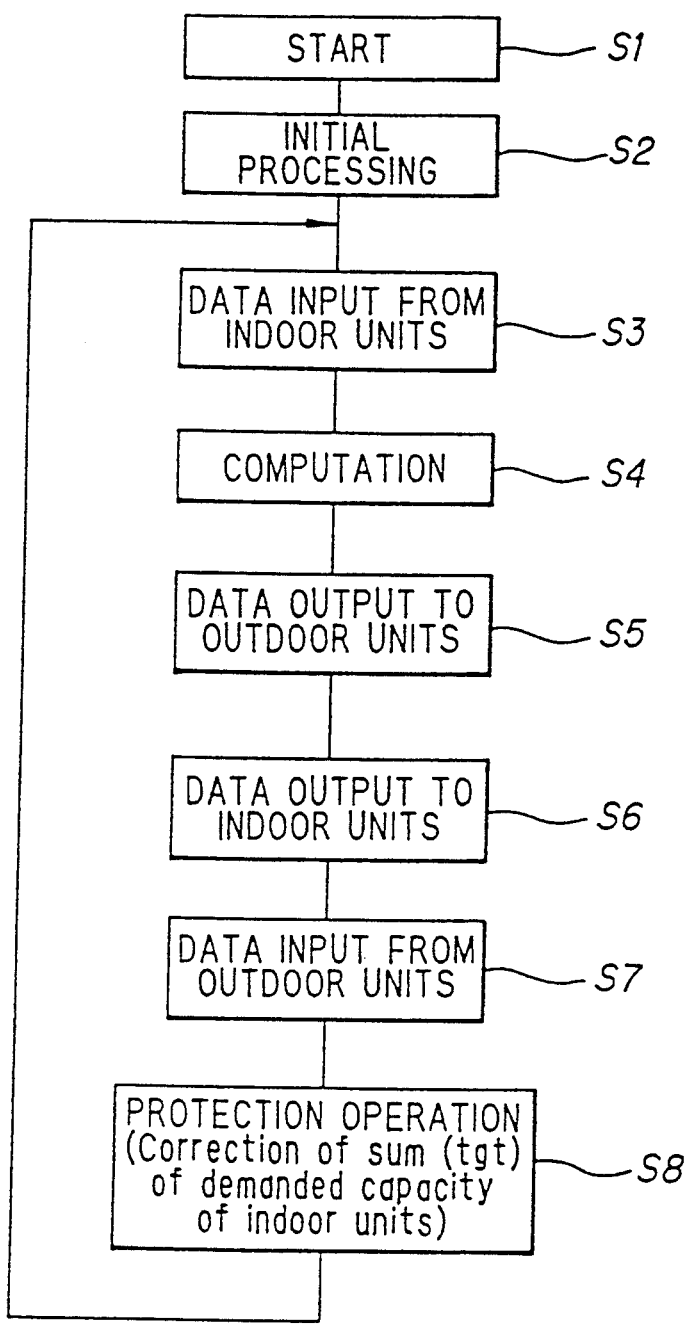
FIG. 3 is a diagram showing a main operation of a microcomputer shown in FIG. 2.

FIG. 3 is a diagram showing the main operations of the microcomputer 25. Referring to this diagram, the microcomputer 25 is started in Step S1. In Step S2, the initial processing by the microcomputer 25 is carried out. Namely, the setting of initial values, the inputting of a set value from the outdoor unit number setting switch 28 and a set value from the indoor unit number setting switch 29, the sending and receiving of initial signals between the outdoor and indoor units and control apparatus and the ascertaining of the number of the outdoor and indoor units are done.

The data sent as initial signals from the outdoor units 11–13 to the control apparatus 10 include data representative of the capacity of the outdoor units. For example, an A-type outdoor unit has a maximum capacity of 5 horsepower and a minimum capacity of 1 horsepower, and the capacity thereof can be varied substantially in a stepless or differential manner between these levels by an inverter. A B-type outdoor unit has a maximum capacity of 10 horsepower and minimum capacity of 1 horsepower. The B-type outdoor unit has a compressor, the operating capacity of which is varied 1–5 horsepower by an inverter and a compressor operated with 5 horsepower by a commercial power source. Thus, the operating capacity of the B-type outdoor unit can be set arbitrarily to 1–10 horsepower. A C-type outdoor unit has a maximum capacity of 10 horsepower, and is operated with 10 horsepower by an electric power supplied from a commercial power source or stopped (zero horsepower). Accordingly, data on the type of outdoor unit actually connected can be inputted. The data of the indoor units are also inputted in the same manner.

After such initial data have been inputted, the operation is advanced to Step S3. In Step S3, data on the demanded capacity of the indoor units 1, 2 are inputted through the signal line 9, and a computation is then carried out in Step S4. Namely, a computation is carried out for allotting the sum of the demanded capacity of the indoor units to the outdoor units connected thereto.

In Step S5, the data on the allotted operating capacity are outputted to the outdoor units through the signal line 22. In Step S6, data are outputted to the indoor units 1, 2, and, in Step S7, data are inputted from the outdoor units 11-13.

In Step S8, a protection operation is carried out on the basis of the data inputted from the indoor units and the data inputted from the outdoor units. For example, when the maximum temperatures in the heat exchangers constituting condensers (heat source-side heat exchanger during a room cooling operation and a room-side heat exchanger during a room heating operation) is not lower than a high-temperature protecting temperature, correction for reducing the sum of the demand capacities is made, and, when a minimum temperature in the heat exchangers constituting evaporators is not higher than a low-temperature protecting temperature, correction for reducing the sum of the demanded capacities is made in the same manner.

With reference to FIGS. 5-15 showing an example of the computation shown in the diagram of FIG. 3, a set value PS(i) of operating capacity to be outputted to an outdoor unit (i), a set value PS(ii) of operating capacity to be outputted to an outdoor unit (ii) and a set value PS(iii) of operating capacity to be outputted to an outdoor unit (iii) are determined. In this case, the number of connected outdoor units is not more than three (3) for the purpose of simplification. FIG. 4 is a diagram showing an example of data indicative of the partition of the connected outdoor units. In this diagram, three outdoor units are shown. When two outdoor units are used with the outdoor unit (ii) not used, the partition is set to ON/OFF, and min(ii) and max(ii) to zero respectively. The same applies to a case where one outdoor unit is used. When the outdoor units (ii) and (iii) are used, the minimum value is equal to the maximum value (min=max).

Figure 5:
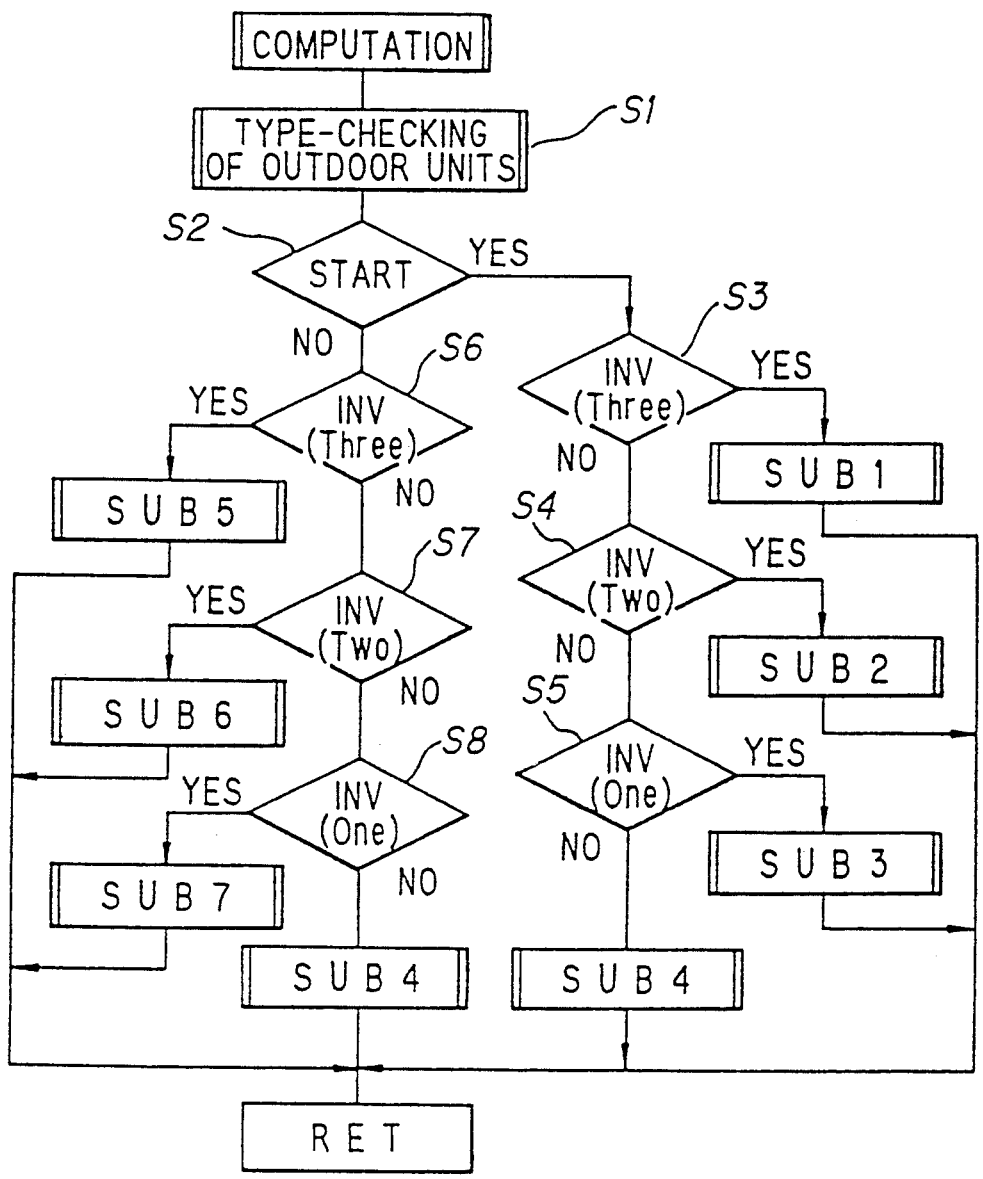
FIG. 5 is a diagram showing a computation operation shown in FIG. 3.

In FIG. 5 showing a main operation, type-checking of the outdoor units is done. First, in Step S1, the number of inverter type outdoor units (capacity variable type outdoor units) from among the outdoor units is determined on the basis of the data shown in FIG. 4. At the same time, the outdoor units are rearranged according to the level of maximum capacity with priority given to the inverter type outdoor units, and allotted to x, y, z. In the case of the data shown in FIG. 4, outdoor unit (x) outdoor unit (i), outdoor unit (y)=outdoor unit (ii), outdoor unit (z)=outdoor unit (iii). The max (ii)=max (iii), and priority is given to the outdoor unit of a smaller number.

In the next Step S2, it is judged whether the air-conditioner should be started or not, i.e., whether the total demand "tgt" of the indoor units is tgt=0→tgt≠0. In Steps S3-S8, subroutines are carried out in accordance with the number of the connected inverter type outdoor units. The setting values PS(x), PS(y), PS(z) of operating capacity for the outdoor units are thereby determined. (On the basis of the data in FIG. 4, x=(i), y=(ii), and z=(iii).)

The outdoor units have the following functions as basic functions. The inverter type outdoor units are stopped when PS<min, and operated with max capacity when PS≧max, and with PS capacity when min≦PS<max. The ON/OFF type outdoor units are stopped when PS=0, and operated when PS=max.

Figure 6:
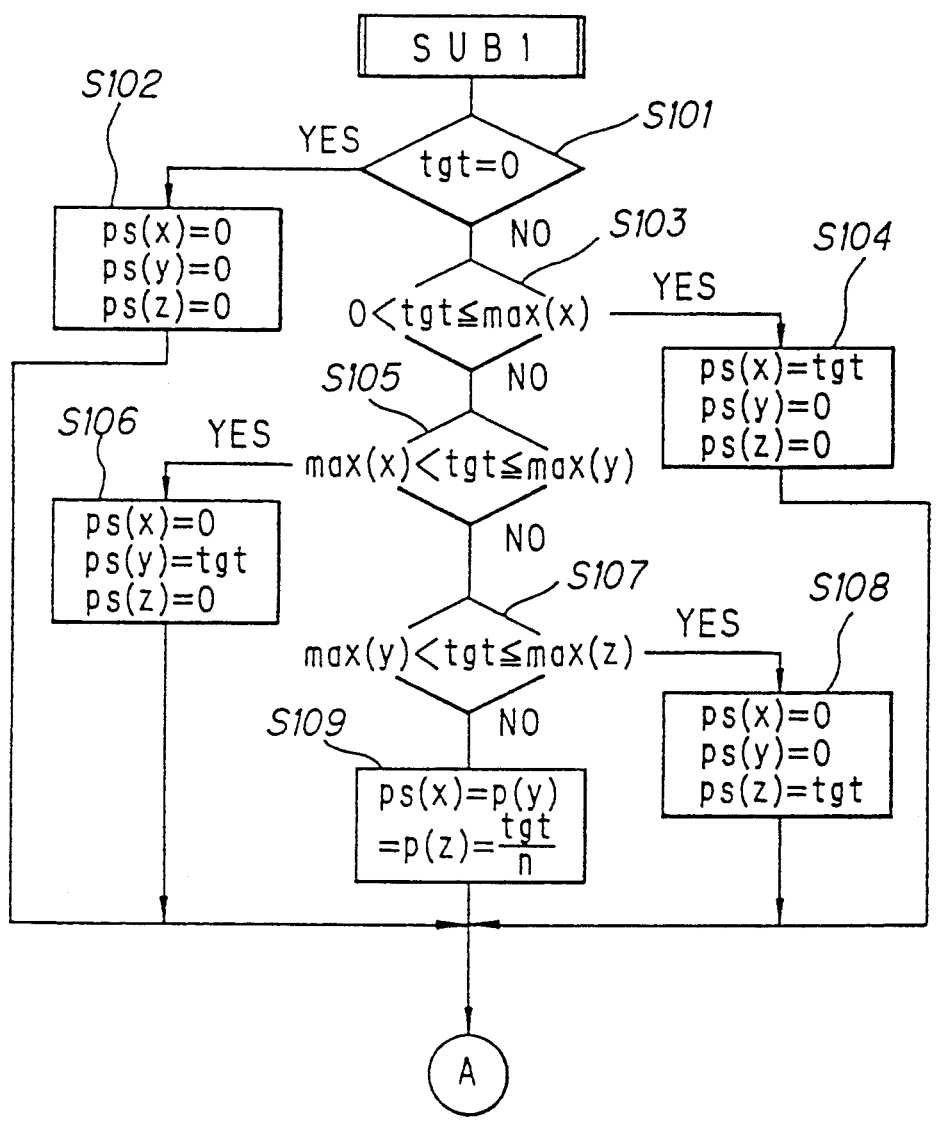
FIGS. 6 and 7 are diagrams of SUB 1 shown in FIG. 5.
Figure 7:
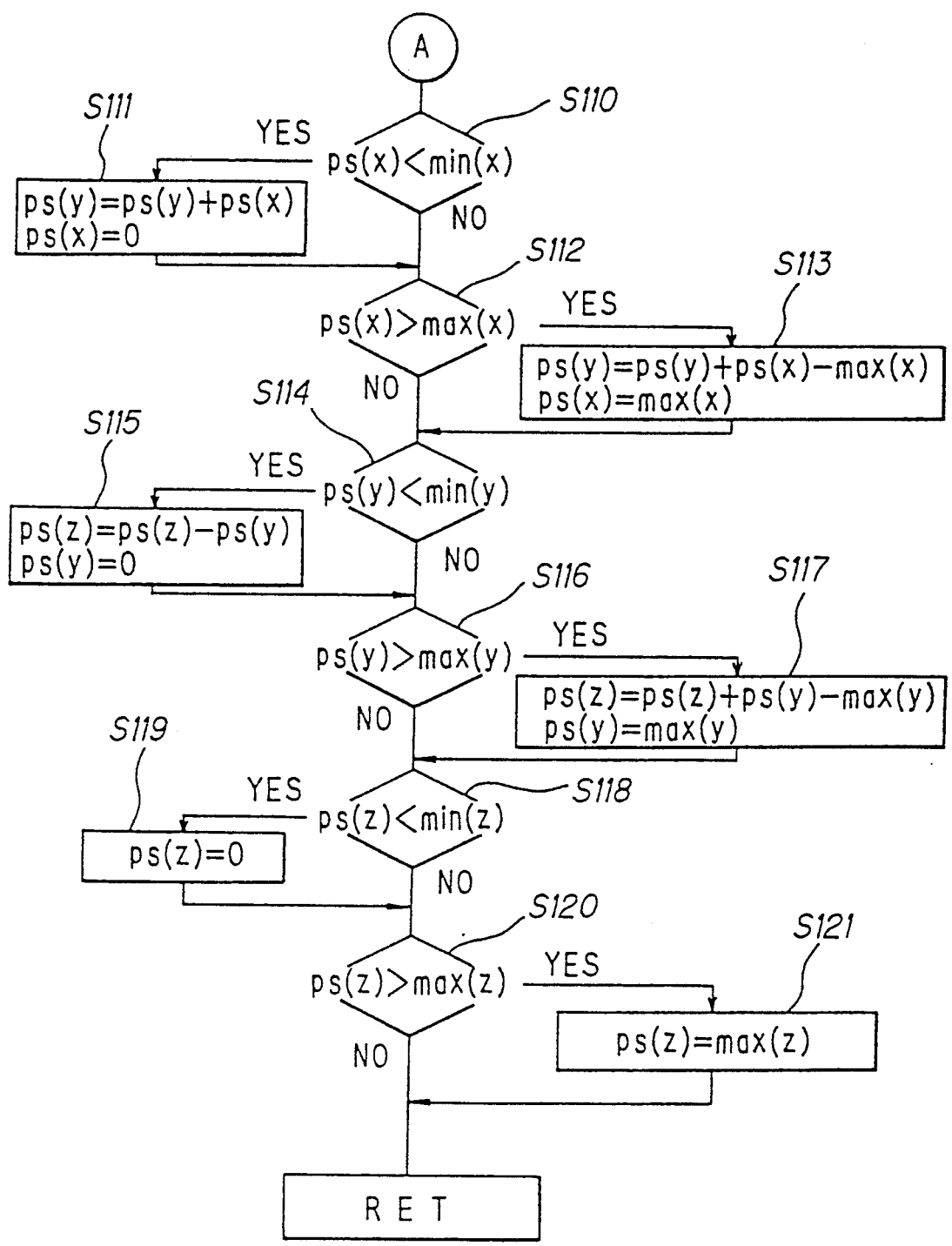

FIGS. 6 and 7 are diagrams of SUB 1 shown in FIG. 5. Step S101 is carried out to judge whether the total demand tgt is 0 or not. When tgt=0, the setting value for all the outdoor units is set to 0. Steps S103, S105 and1 S107 are carried out, and Steps S104, S106, S108 and S109 are then carried out in accordance with the value of tgt to determine the outdoor units to be started and the setting values therefor. The letter n is Step S109 denotes the number of connected inverter type outdoor units.

Steps S110-S121 are then carried out to judge whether the values set on the outdoor units exceed the minimum and maximum capacity thereof or not. When setting values smaller than the minimum capacity are given to the outdoor units, these outdoor units are stopped, so that the actual operating capacity of all the outdoor units decreases. When setting values exceeding the maximum capacity are given to the outdoor units, the outdoor units are operated with maximum capacity, so that the actual operating capacity decreases similarly. This gives rise to trouble. Therefore, the setting values for the outdoor units are corrected in order from an outdoor units of the smallest maximum operating capacity to an outdoor unit of the largest maximum operating capacity by practicing these steps. For example, when the setting value given to the outdoor unit (x) is PS(x)<min(x), the outdoor unit (x) is stopped, and this setting value is added to the setting value PS(y) for the outdoor unit (y). When PS(x)>max(x), a setting value exceeding the max(x) is added to the setting value PS(y). When the demand tgt is tgt<min(x) and tgt<min(y) and tgt <min(z), none of the outdoor units are started, and, when tgt≧max(x)+max(y)+max(z), all the outdoor units are operated with maximum capacity.

Figure 8:
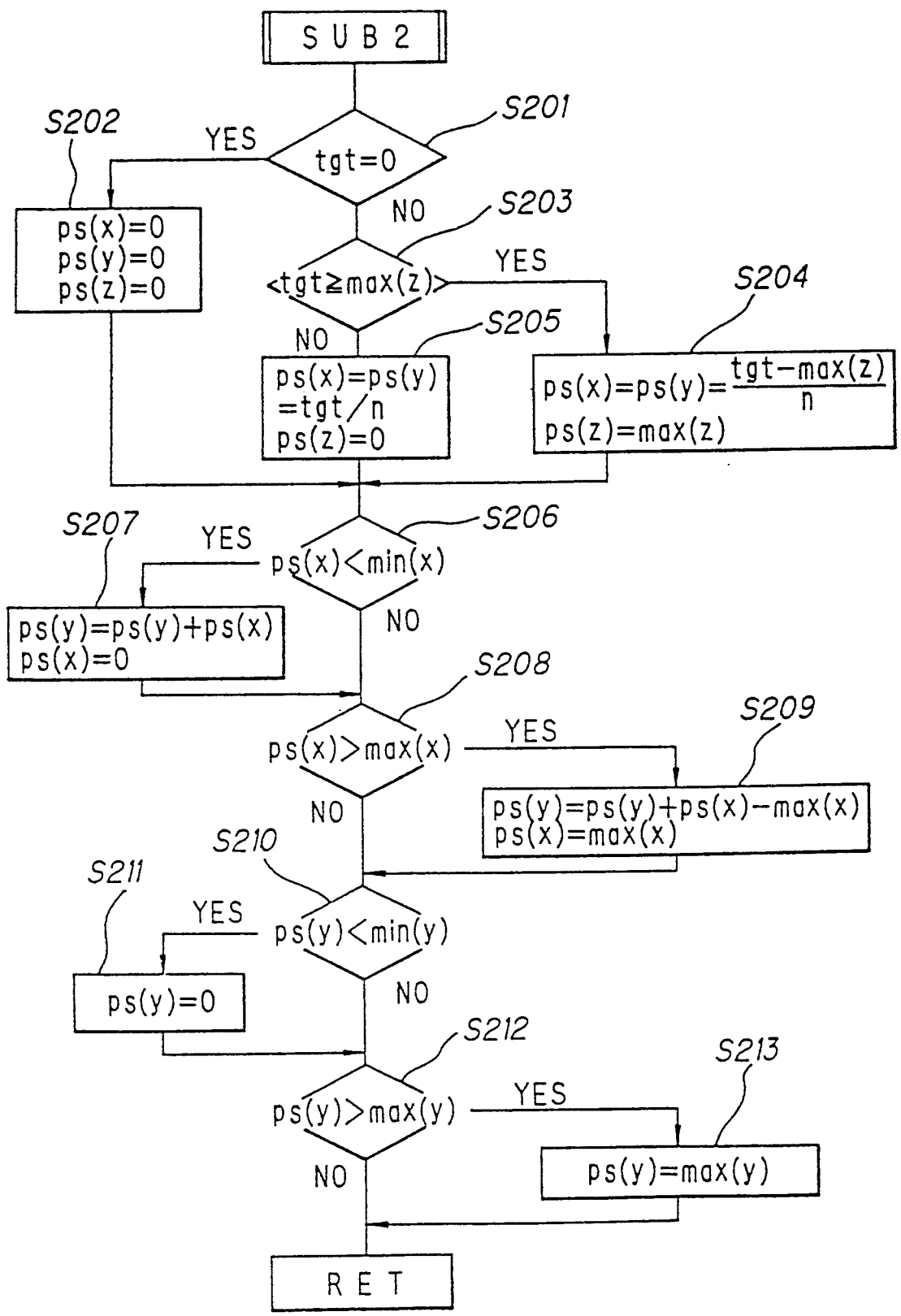
FIG. 8 is a diagram of SUB 2 shown in FIG. 5.

With reference to FIG. 8 showing an operation of SUB 2, Step S203 is carried out to judge whether the demanded capacity tgt is tgt≧max(z), i.e., whether tgt exceeds the operating capacity of the ON/OFF type outdoor units (z) or not. When the conditions in Step S203 are satisfied, Step 204 is carried out to determine the setting value in accordance with PS(x)=PS(y)=[tgt-max(z)]/n, PS(z)=max(z). When the conditions in Step S203 are not satisfied, Step S205 is carried out to determine the setting value in accordance with PS(x)=PS(y)=tgt/n. The represents the number of the inverter type outdoor units. Steps S206-S213 are then carried out in the same manner as SUB 1 of FIGS. 6 and 7 to correct PS(x) and PS(y), i.e., the setting values to be applied to the inverter type outdoor units. Steps S206-S210 are the same as Steps S110-S114. In Step S211, addition to the outdoor unit (z) cannot be done, so that PS(y) equals zero (PS(y)=0). When PS(y)<min(y)<max(z), the outdoor unit (z) is stopped. In Step S212 and S 213, max(y)<PS-(y)<max(y) is judged with the conditions in Step S203, and the setting value is determined as PS(y)=max(y). During this time, the operating capacity with respect to tgt varies in a stepped manner. Accordingly, it is preferable that an outdoor unit satisfying max(y)≧max(z) be used.

In this SUB 2, a case where min(z)=max(z)=0, i.e., a case where the outdoor unit(z) is not connected is discussed. The conditions in Step S203 are always satisfied, and, in Step S204, the setting value becomes PS(z)=max(z)=0. Namely, an air-conditioning operation by the two inverter type outdoor units (x), (y) is carried out.

Figure 9:
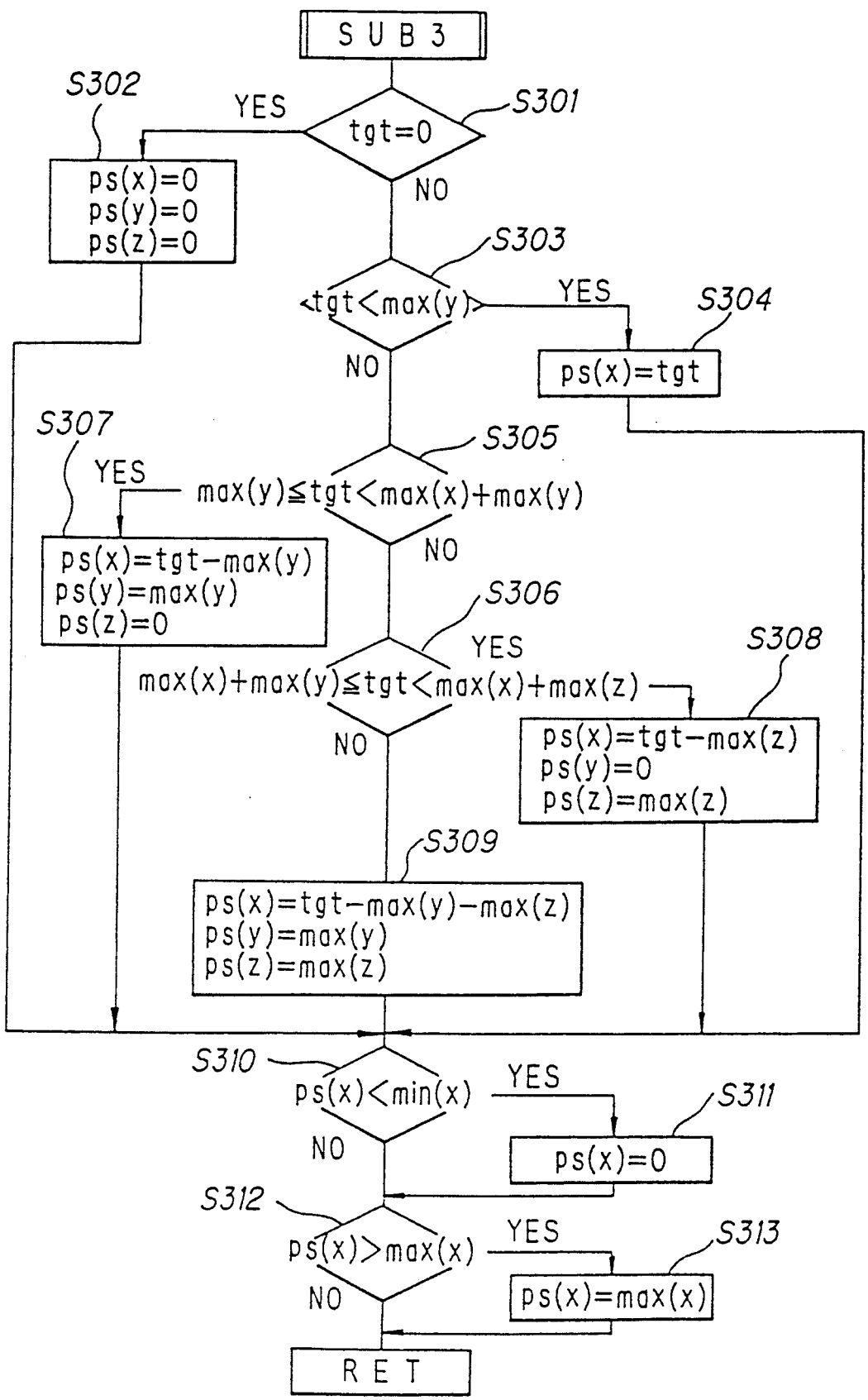
FIG. 9 is a diagram of SUB 3 shown in FIG. 5.

In FIG. 9 showing an operation of SUB 3 shown in FIG. 5, Step S303 is carried out to judge whether the demand tgt is tgt<max(y). Namely, tgt is judged as to whether it is smaller than max(y) of the ON/OFF type outdoor unit (y) of a smaller maximum capacity or not. When these conditions are satisfied, Step S304 is carried out to determine the setting value as PS(x)=tgt. PS(y) and PS(z) become zero (0).

Steps S305, S306 are then carried out to determine the range from among the ranges max(y)<max(x)+max(y)<max(x)+max(z) to which tgt belongs. One of Steps S307, S308 and S309 is then carried out in accordance with the result of the determination of the range. If Step S307 is carried out, an operation by the outdoor units (x) and (y) is set, if Step S308 is carried out, an operation by the outdoor units (x) and (z) is set, and, if Step S309 is carried out, an operation by the outdoor units (x), (y) and (z) is set.

In Steps S310-S313, the correction of the setting value PS(x) is carried out. When PS(x)<min(x), PS(x)=0, and, when PS(x)>max(x), PS(x)=max(x). When the outdoor unit(z) is not connected, the data are set to min(z)=max(z)=0 in the same manner as described above, and, when the outdoor unit (y) is not connected, the data are set to min(y)=max(y)=0 in the same manner. In this case, an operation by the outdoor unit (x), that is, the outdoor unit of inverter type, alone is carried out.

Figure 10:
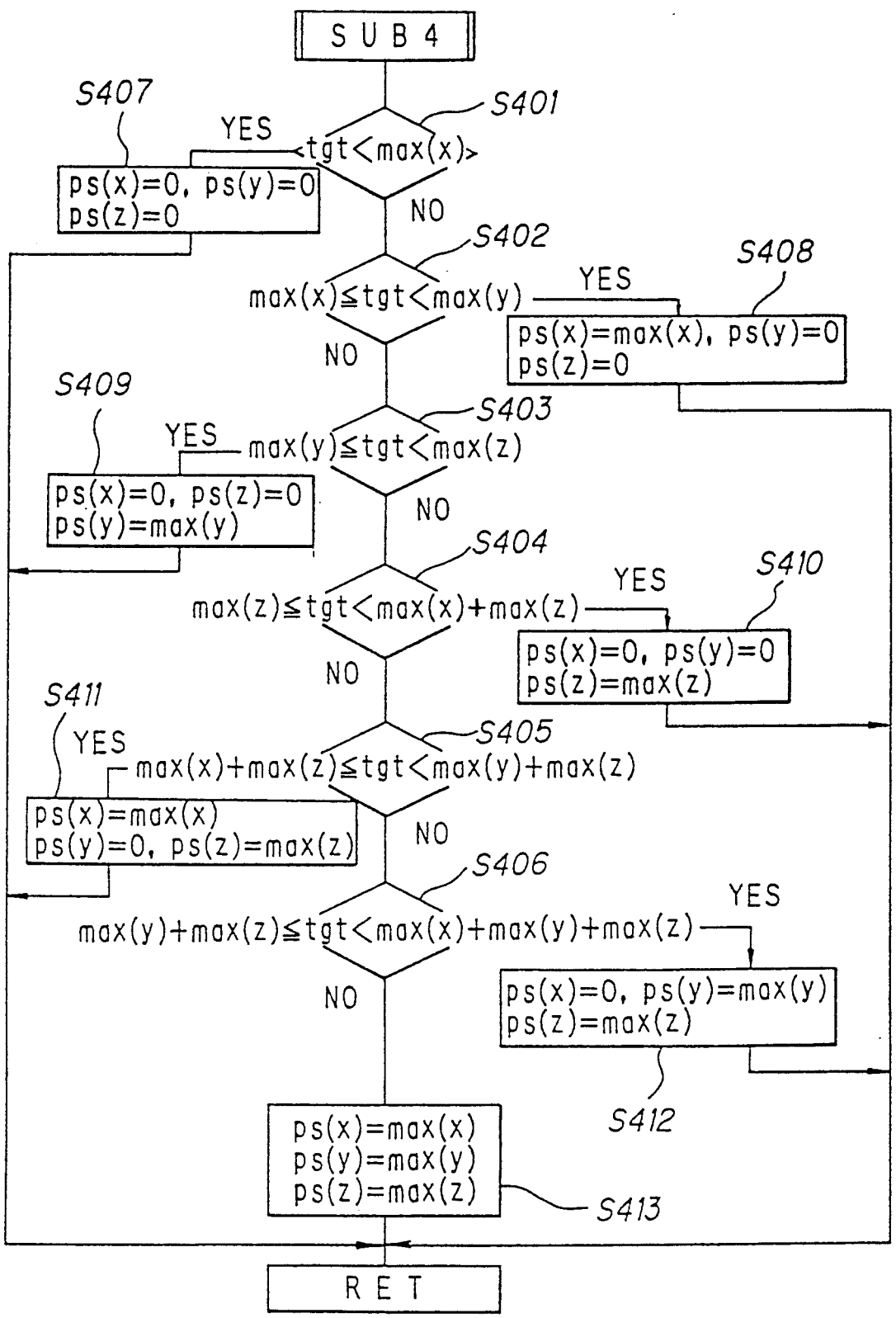
FIG. 10 is a diagram of SUB 4 shown in FIG. 5.

In FIG. 10 showing an operation of SUB 4, the demand is determined by carrying out Steps S401-S406 to make a 7-step setting value alteration in Steps S407-S413. Accordingly, the demand tgt in one of the ranges max(x)<max(y)<max(z) <max(x)+max(z)<max(y)+max(z)<max(x)+max(y)+max(z). Steps S407-S413 are carried out in order from a case where the demand tgt is the smallest to a case where the demand tgt is the largest. Namely, Step S407 is carried out to set the stopping of operations of all the outdoor units, Step S408 to set an operation of the outdoor unit (x), Step S409 to set an operation of the outdoor unit(y), Step S410 to set an operation of the outdoor unit (z), Step S411 to set operations of the outdoor units (x) and (z), Step S412 to set operations of the outdoor units (y) and (z), and Step 413 to set the operations of all the outdoor units.

Since the SUB 4 is also carried out when the demand is varied, a suitable differential may be set for the purpose of preventing the occurrence of chattering in an ON/OFF operation (the setting of a maximum capacity/stoppage) of each of the outdoor units conducted due to the increase and decrease of tgt.

Figure 11:
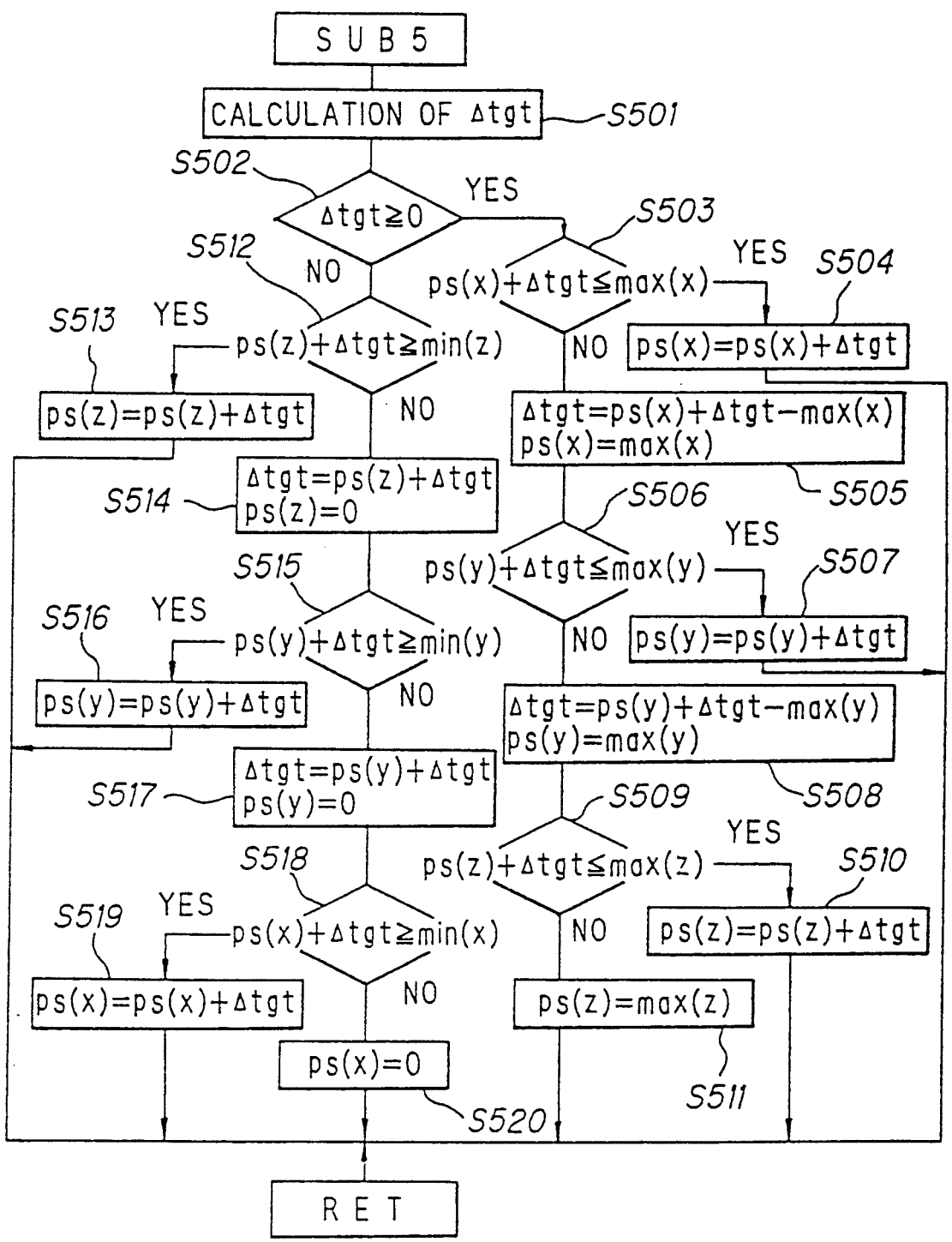
FIG. 11 is a diagram of SUB 5 shown in FIG. 5.

With reference to FIG. 11 showing an operation of SUB 5 in FIG. 5, Step S501 is carried out a determine change Δtgt of the demand tgt. Step S502 is then carried out to judge whether the Δtgt is Δtgt≧0. When the conditions in Step S502 are satisfied, Steps S503-S511 are carried out to increase the setting values in order from the setting value for an outdoor unit of the smallest maximum capacity to the setting value for an outdoor unit of the largest maximum capacity. For example, it is judged whether the sum of the change Δtgt and the setting value PS(x) of the outdoor unit (x) is not more than max(x) or not (Step S503). When the conditions in Step S503 are satisfied, Step S504 is carried out to determine the setting value PS(x) as PS(x)=PS(x)+Δtgt. When the conditions in Step S503 are not satisfied, Step S505 is carried out to set PS(x)=max(x), and an excess value with respect to the maximum capacity of the outdoor unit (x) is newly set as Δtgt, which is to be added to tgt of the outdoor unit(y).

Consequently, this new tgt is added to ΔPS(y) in Step S506 to judge whether the conditions PS(y)+Δtgt-≦max(y) are satisfied, the operation is advanced to Step S507, and, when these conditions are not satisfied, the operation is advanced to step S508. In Steps S509-S511, the setting value for the outdoor unit (z) is determined in the same manner as necessary.

If these Steps S503-S511 are carried out with, for example, the outdoor unit (x) already set to max(x), Δtgt is added to the setting value PS(y) for the outdoor unit (y).

When the Δtgt is negative in Step S502, Steps S512-S520 are carried out to reduce the setting values in order from an outdoor unit of the largest maximum capacity to an unit of the smallest maximum capacity. For example, the setting value obtained by adding a varied portion Δtgt (negative value) to the setting value PS(z) for the outdoor unit (z) is judged whether it is not more than min (z) (Step S512). When the conditions in Step S512 are satisfied, Step S513 is carried out to determine the setting value PS(z) as PS(z)=PS(z)+Δtgt. When the conditions in Step S512 are not satisfied, Step S514 is carried out to determine the setting value as PS(z)=0, and an excess value to be reduced tgt with respect to the PS(z) of the outdoor unit (z) is newly set as tgt, which is to be reduced from Δtgt of the outdoor unit (y).

Consequently, this new Δtgt (negative value) is added to PS(y) in Step S515 to judge whether the conditions of PS(y) +tgt≧min(y) are satisfied or not. When the conditions in Step S515 are satisfied, the operation is advanced to Step S516, and, when the conditions are not satisfied, the operation is advanced to Step S517. The setting value for the outdoor unit (x) is set in the same manner as necessary in Steps S518-S520.

As described above, in order to increase the demanded capacity tgt in SUB5, the increasing operation is carried out from an outdoor unit of the smallest maximum capacity to an outdoor unit of the largest maximum capacity, and, in order to reduce the demand tgt, the reducing operation is carried out from an outdoor unit of the largest maximum capacity to an outdoor unit of the smallest maximum capacity.

Figure 12:
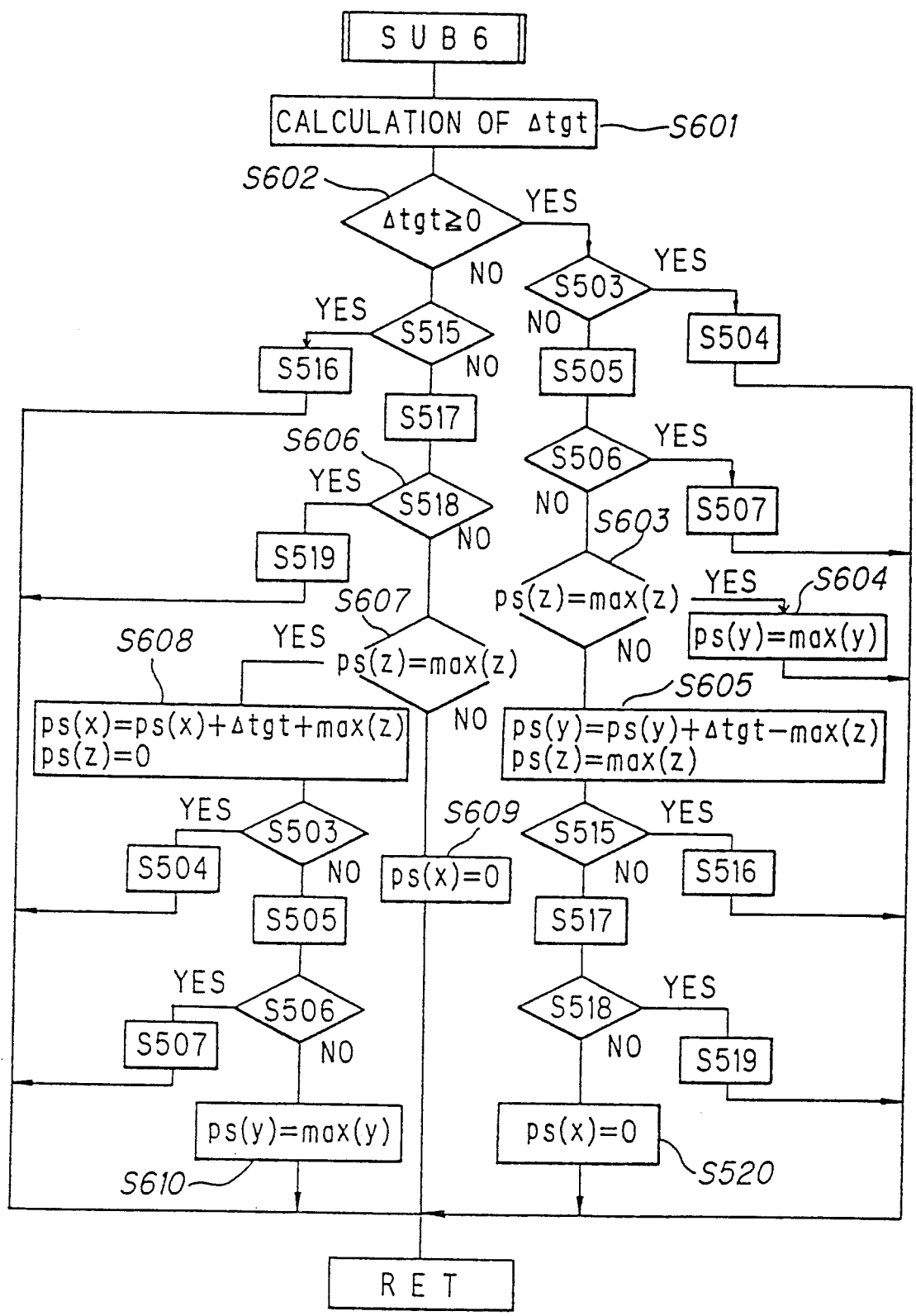
FIG. 12 is a diagram of SUB 6 shown in FIG. 5.

FIG. 12 is a flow chart of SUB6 shown in FIG. 5. Step S601 is carried out to calculate a varied portion Δtgt of the demand tgt, and Step S602 to judge whether Δtgt is Δtgt≧0 or not. When the conditions in Step S602 are satisfied, Steps S503-S507 (refer to FIG. 11) are carried out to increase the setting value for the outdoor units (x), (y) in order.

When the conditions in Step S506 are not satisfied, i.e., when the operating capacity is insufficient even with the PS(x)=max(x) of the outdoor unit (x) and PS(y)=max(y) of the outdoor unit (y), Step S603 is carried out to judge whether the outdoor unit (z) is PS(z)=max(z) (in operation) or not. When the conditions in Step S603 are satisfied, the operating capacity cannot be increased any more, so that Step S604 is carried out to set the setting values of all the outdoor units to the levels of their maximum capacity.

When the conditions in Step S603 are not satisfied, i.e., when the outdoor unit (z) is stopped, Step S605 is carried out. In step S605, the outdoor unit (z) is operated to set the reduction of an excess portion of the setting value (operating capacity) with respect to $\Delta$tgt (set in Step S505) from the setting value for the outdoor unit (y) in the operation of the outdoor unit (z) [PS(z)=max(z)]. Steps S515-S520 are then carried out, and, when PS(y) min(y), the value of PS(x) is further reduced in the same manner as in SUB5.

When the conditions in Step S602 are not satisfied, Steps S515-S519 are carried out to reduce the setting values for the outdoor units (y), (x) in the same manner as mentioned above. When the conditions in step S606 (Step S518) are not satisfied (when an operation of capacity not less than the demand tgt is carried out even if the operations of the units (x), (y) are stopped), Step S607 is carried out to judge whether the outdoor unit (Z) is operated or not. When the conditions in Step S607 are satisfied, Step S608 is carried out. In step S608, the outdoor unit (z) is stopped, and a difference, which occurs due to the stopping of this outdoor unit (z), between max(z) and $\Delta$tgt (set in Step S517) is added to the outdoor unit (x) is corrected in the same manner as previously described, by carrying out Steps S503-S507.

If Step S609 is carried out, all the outdoor units are stopped. If Step S610 is carried out, PS(y)=max(y) is set.

As described above, the varied portion $\Delta$tgt of the demand tgt is first regulated in the outdoor units (x), (y) (inverter type), and an excess portion which is higher than the levels in this regulation range is regulated by operating/stopping the outdoor unit (z), in, SUB6.

Figure 13:
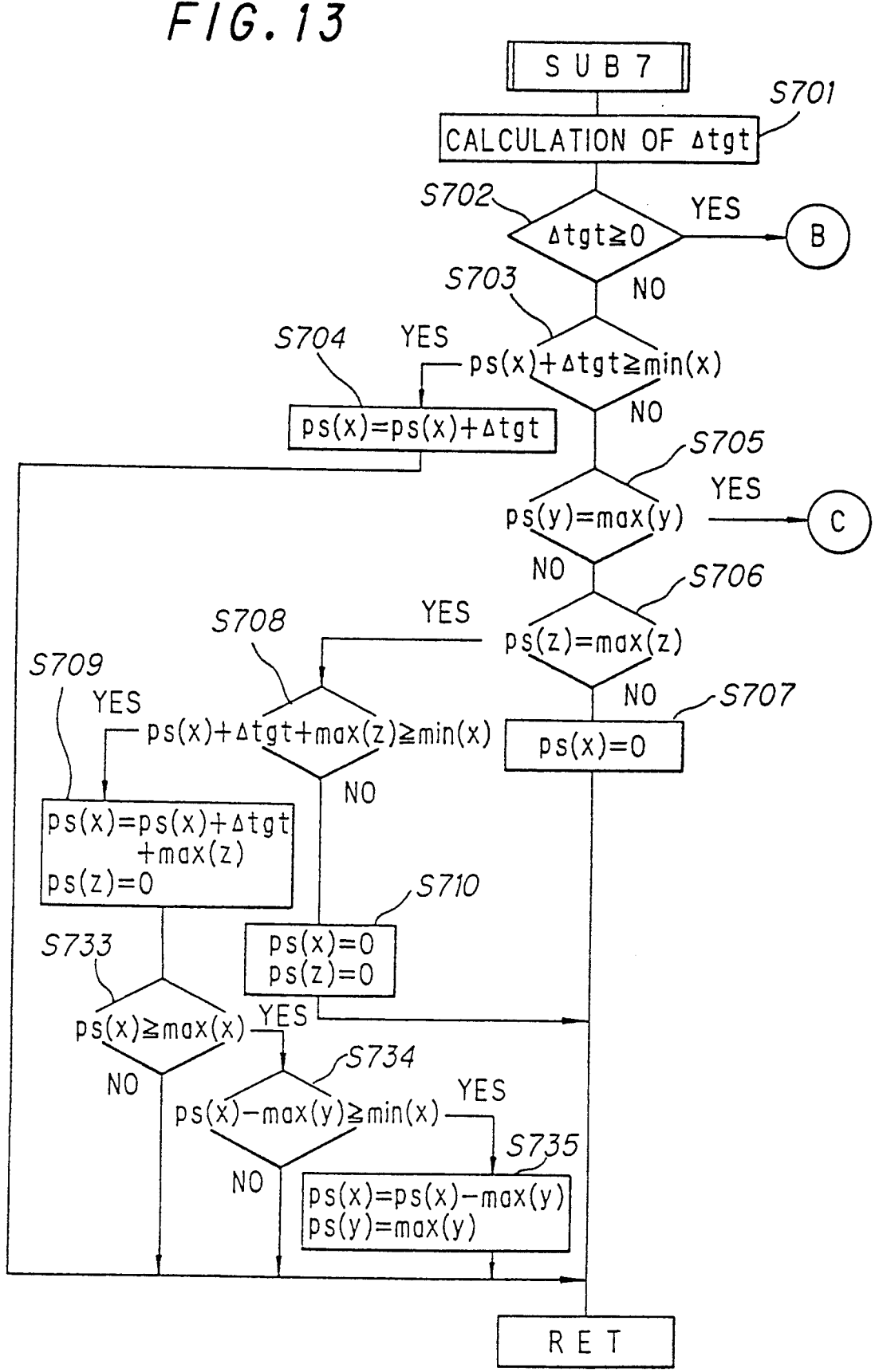
FIGS. 13, 14 and 15 are diagrams of SUB 7 shown in FIG. 5.
Figure 14:
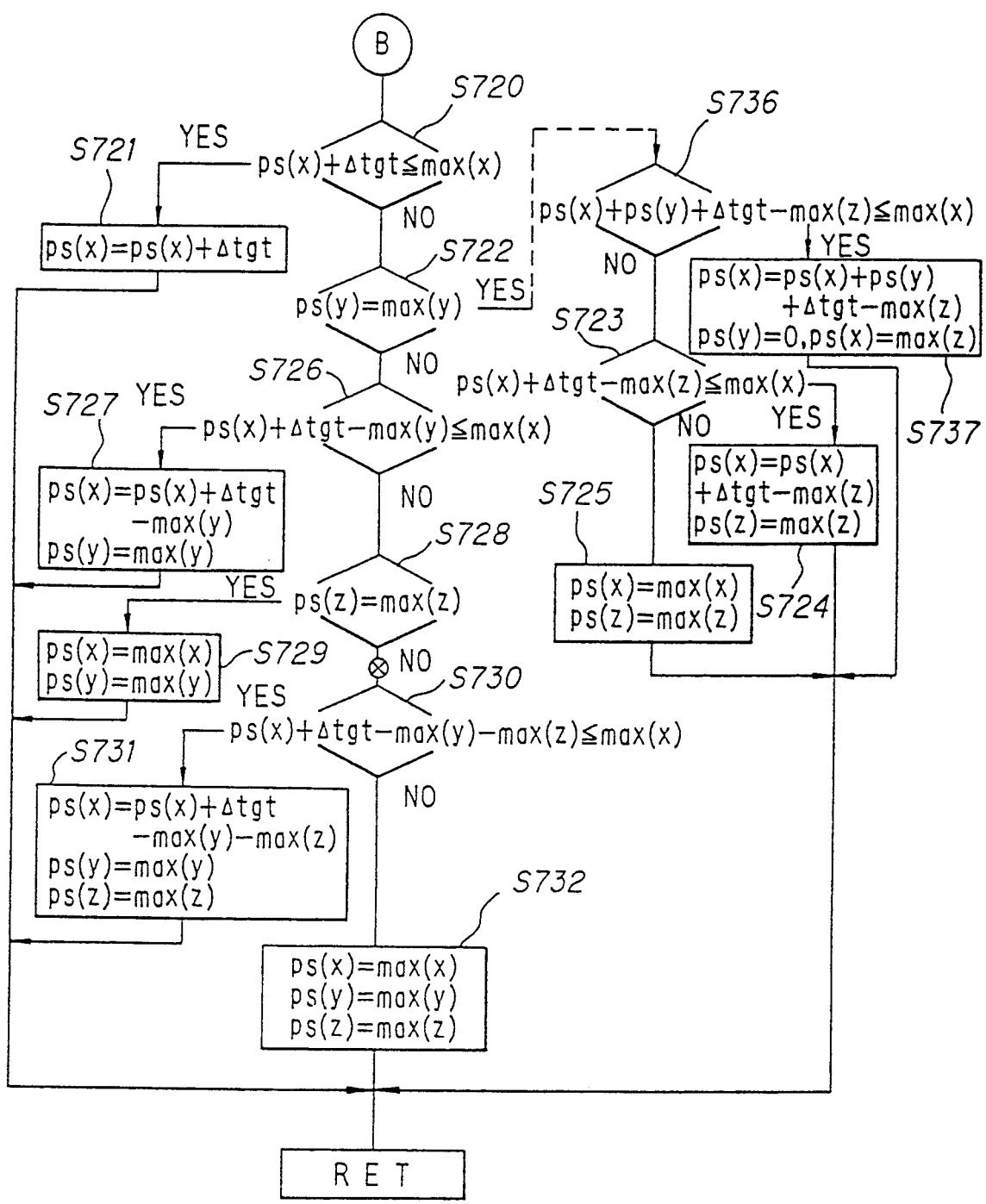
Figure 15:
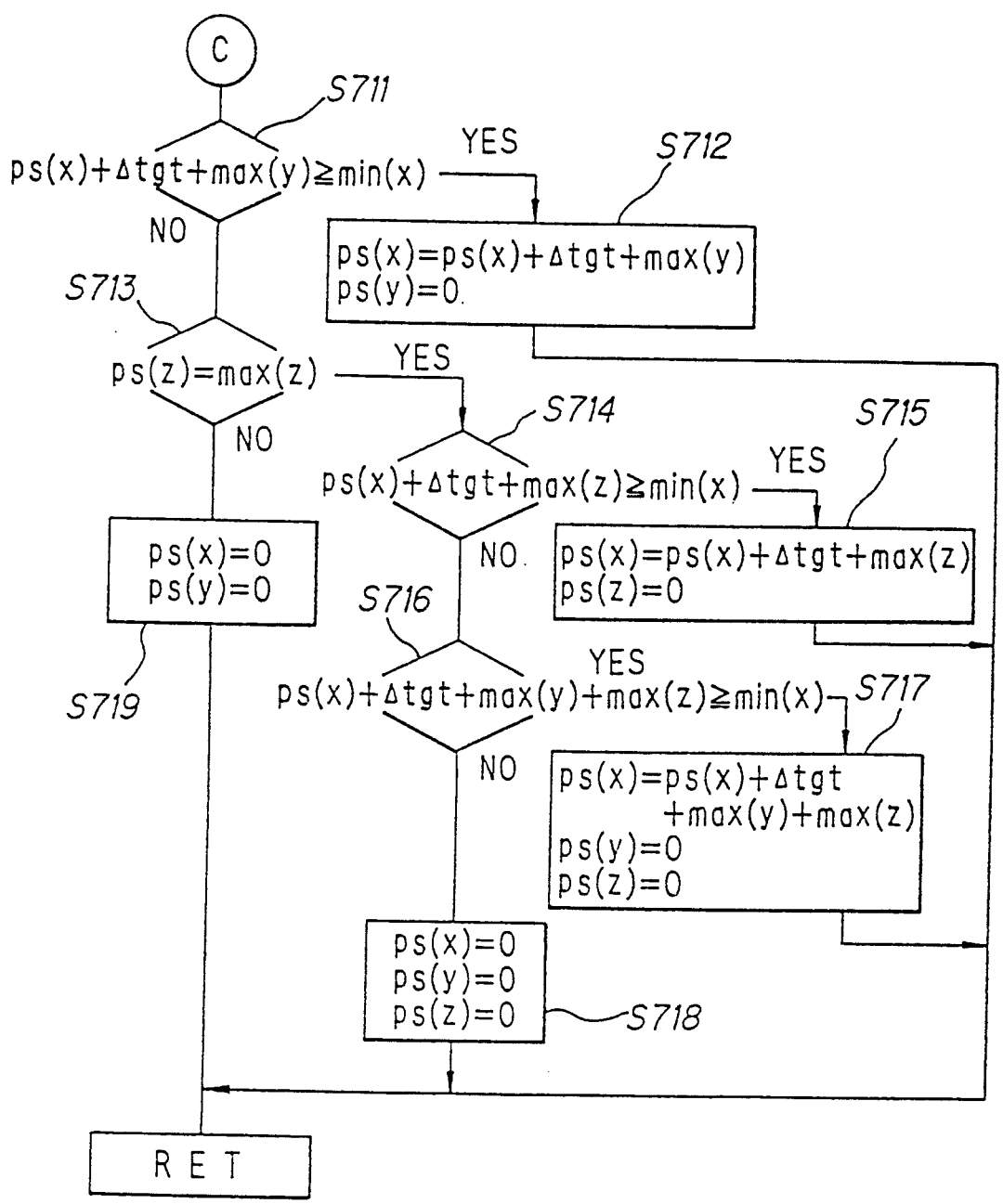

FIGS. 13-15 are flow charts of SUB 7 shown in FIG. 5. Step S701 is carried out to determine a varied portion $\Delta$tgt of the demand tgt, and it is judged, whether the conditions of $\Delta$tgt$\geq$0 in Step S702, are satisfied, if not satisfied, Step S703 is carried out to judge whether the setting value PS(x) for the outdoor unit (x) is PS(x)$\geq$min(x). When the conditions in Step S703 are satisfied, Step S704 is carried out to set PS(x) to PS(x)=PS(x)+$\Delta$tgt.

When the conditions in Step S703 are not satisfied, Steps S705, S706 are carried out to judge whether the outdoor units (y), (z) are operated or not. When both of the outdoor units (y), (z) are stopped, the operation is advanced to Step S707 to stop the operation of the outdoor unit (x). When the outdoor unit (y) is stopped with the outdoor unit (z) in operation, the operation is advanced to Steps S708-S710.

In Step S708, it is judged whether a shortage of capacity with respect to the demand tgt, which occurs when the outdoor unit (z) is stopped with respect to the change $\Delta$tgt, exceeds the min(x) of the outdoor unit (x) (inverter type). When the conditions in Step S708 are satisfied, Step S709 is carried out to stop the outdoor unit (z), and determine the setting value for the outdoor unit (x) as PS(x)=PS(x)+$\Delta$tgt+max(z). Steps S733-S735 are then carried out, and, when the setting value exceeds max (y), the outdoor unit (y) is operated. When the conditions in Step S708 are not satisfied, Step S710 is carried out to stop the outdoor units (x), (z).

When the outdoor unit (y) is operated in Step S705, Steps S711-S719 shown in FIG. 15 are carried out. In Step S711, it is judged whether a shortage of capacity with respect to the demand tgt, which occurs when the outdoor unit (y) is stopped with respect to the change $\Delta$tgt, exceeds the min(x) of the outdoor unit (x) is made. When the conditions in Step S711 are satisfied, Step S712 is carried out to stop the outdoor unit (y), and determine the setting value for the outdoor unit (x) as PS(x)=PS(x)+$\Delta$tgt+max(y).

When the conditions in Step S711 are not satisfied (when the reduction of $\Delta$tgt cannot be attained even if the outdoor unit (y) is stopped), Step S713 is carried out to further judge whether the outdoor unit (z) is operated or not. When the conditions in Step S713 are satisfied, Step S714 is carried out to judge whether a shortage of capacity with respect to the demand tgt, which occurs when the outdoor unit (z) is stopped, exceeds min (x) of the outdoor unit (x) or not. When the conditions in Step S714 are satisfied, Step S715 is carried out to stop the outdoor unit (z), and determine the setting value for the outdoor unit (x) as PS(x)=PS(x)+$\Delta$tgt+max. When the conditions in Step S714 are not satisfied, Step S716 is carried out to judge whether a shortage of capacity with respect to the demand tgt, which occurs when the outdoor units (y), (z) are stopped, exceeds min(x) of the outdoor unit(x). When the conditions in Step S716 are satisfied, Step S717 is carried out to stop the outdoor units (y), (z), and determine the setting value for the outdoor unit (x) as PS(X)=PS(x)+$\Delta$tgt +max(y)+max(z).

When the conditions in Step S716 are not satisfied, Step S718 is carried out to stop all the outdoor units. When the conditions in step S713 are not satisfied, Step S719 is carried out to stop the outdoor units (x), (y).

When the demand tgt has decreased as mentioned above, the setting values of the outdoor unit (x) (inverter type), outdoor unit (y) (ON/OFF type), outdoor unit (z) (ON/OFF type) and outdoor unit (y)+outdoor unit (z) are reduced in the mentioned order in accordance with the varied portion $\Delta$tgt.

When the conditions in Step S702 are satisfied, step S720 is carried out to judge whether PS(X)+$\Delta$tgt$\leq$max(x) or not. When the conditions in Step S720 are satisfied, Step S721 is carried out to determine the setting value for the outdoor unit(x) as PS(x)=PS(X)+$\Delta$tgt.

When the conditions in Step S720 are not satisfied, the operation is advanced to Step S722 to judge whether the outdoor unit (y) is operated or not. When the outdoor unit (y) is in operation, Step S736 is carried out to judge whether PS(x) during the operation of the outdoor unit (z) is not more than max(x). In Step S737, the outdoor unit (y) is stopped, and the outdoor unit (z) is operated. Step S723 is then carried out to judge whether the setting value for the outdoor unit (x) during the operation of the outdoor unit (z) is not more than max(x) or not. When the conditions in Step S723 are satisfied, Step S724 is carried out to operate the outdoor unit (z) and determine the setting value for the outdoor unit (x) as PS(x)=PS(x)+$\Delta$tgt −max(z). When the conditions in Step S723 are not satisfied, Step S725 is carried out to operate the outdoor unit (x) with max(x) and operate the outdoor unit (z).

Even when the value of PS(x) obtained after Step S724 has been carried out is not more than min(x), it is set as it is on the outdoor unit (x). The outdoor unit (x) is stopped when a setting value not more than min(x) is given, and no trouble occurs.

When the conditions in Step S722 are not satisfied, i.e., when the outdoor unit (y) is stopped, Step S726 is carried out to judge whether the setting value for the outdoor unit (x) during the operation of the outdoor unit (y) is less than max(x). When the conditions in Step S726 are satisfied, Step S727 is carried out to operate the outdoor unit (y), and the setting value of the outdoor unit (x) is thereafter determined as $PS(x) = PS(x) + \Delta tgt - max(y)$.

When the conditions in Step S726 are not satisfied, Step S728 is carried out to judge whether the outdoor unit (z) is operated or not.

When the conditions in Step S728 are satisfied (when the outdoor unit (z) is operated), Step S729 is carried out to operate the outdoor unit (x) with max (x) and the outdoor unit (y) as well. When the conditions in Step S728 are not satisfied, Step S730 is carried out to judge whether the setting value for the outdoor unit (x) during the operations of the outdoor units (y), (z) is less than max (x). When the conditions in Step S730 are satisfied, the outdoor units (y), (z) are operated to determine the setting value for the outdoor unit (x) as $PS(x) = PS(x) + \Delta tgt - max(y) - max(z)$.

When the conditions in Step S730 are not satisfied, all the outdoor units are operated with their maximum capacity.

As described above, the demanded capacity tgt is increased from that for the outdoor unit (x), and then to those for the outdoor unit (y), outdoor unit (Z) and outdoor unit (x) +outdoor unit (z) in the described order.

Figure 16:
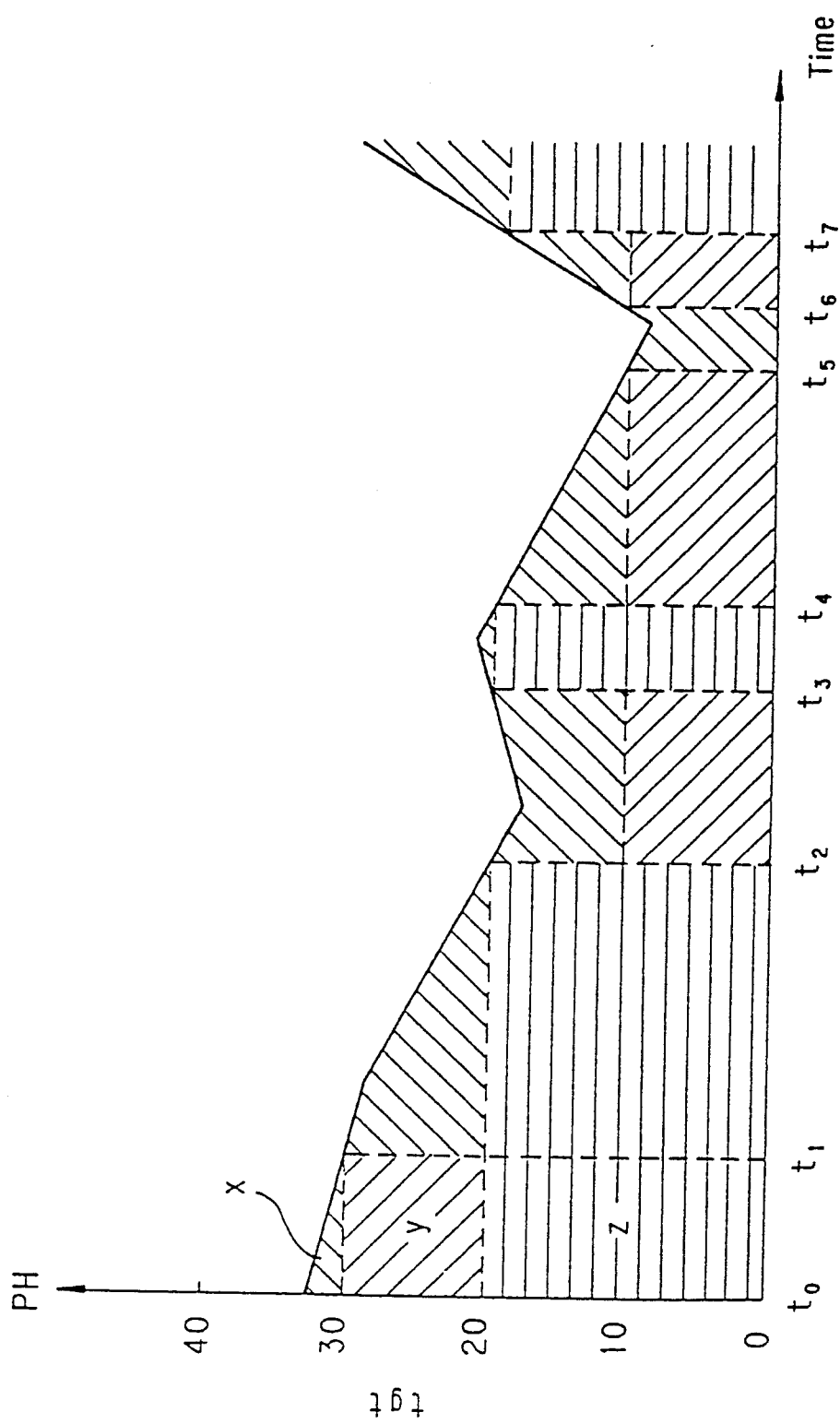
FIG. 16 is a graph showing variations of operating conditions of the outdoor units with respect to the sum of demanded capacities of the indoor units.

The setting values PS(x), PS(y), PS(z) thus determined for the outdoor units are transmitted to the same outdoor units. The operations of outdoor units, the capacity of which is min(i) = 1, max(i) = 10, min(ii) = 10, max(ii) = 10, min(iii) = 20, max(iii) = 20, used as the outdoor units (i)–(iii) (FIG. 4) will be described with reference to FIG. 16. When the outdoor units start operation at an instant $t_0$ with a demand of 32.5 horsepower, the outdoor unit (x) (x=i) is set to 2.5 horsepower, the outdoor unit (y) (y=ii) 10 horsepower, and the outdoor unit (z) (z=iii) 20 horsepower on the basis of the flow chart of SUB3. The setting value for the outdoor unit (x) the rafter decreases till an instant $t_1$. Between the instants $t_1$, $t_2$, the operations of the outdoor units (x), (z) are carried out. The operation is thereafter carried out similarly with the outdoor units (x), (y), (z) combined.

In this embodiment, the maximum capacity of each outdoor unit is determined selectively so that the operating capacity is continuous. For example, if the maximum capacity of the outdoor unit (x) is set to 8 horsepower, the operating capacity becomes discontinuous in the sections $t_1$-$t_2$, $t_2$-$t_3$ . . . , and, to prevent this problem, the maximum capacity of the outdoor units are determined selectively so that the operating capacity becomes continuous.

The control apparatus according to the present invention described above, is thus capable of allotting the sum of the capacities demanded of the outdoor units, on the basis of the type (capacity variable type or ON/OFF type) and maximum capacity of the connected outdoor units.

These outdoor units are of multi-purpose type adapted to be operated with a given setting value (or an ON/OFF signal) of operating capacity, and a combination of these outdoor units and any one of the indoor units can be utilized as a multi-purpose air-conditioner. Namely, the apparatus of the present invention can control an air-conditioner in which multi-purpose indoor and outdoor units are combined so that a required capacity can be obtained, and enables the degree of freedom of setting a required capacity to be increased.

Furthermore, in order to increase the capacity of the outdoor units when an indoor unit is added to the previously-installed indoor units, the changing of the overall capacity can be done very easily by merely connecting the singal lines of the indoor and outdoor units together.

According to the present invention described above, in which a plurality of multi-purpose outdoor units having capacity-variable type and ON/OFF type compressors, and a plurality of multi-purpose indoor units are parallel-connected with refrigerant pipes, the total demand of the indoor units is allotted on the basis of the maximum operating capacity of the respective outdoor units and the type of the compressors, i.e. capacity variable compressors or ON/OFF type compressors provided in the outdoor units, whereby the outdoor units can be connected arbitrarily irrespective of whether they are of a capacity variable type or of an ON/OFF type.

Therefore, an optimum maximum capacity can be set by combining multi-purpose outdoor units. Namely, unlike the conventional apparatus in which an outdoor unit having the capacity close to a desired level is selected from among outdoor units of specially set maximum capacity, the present invention can increase the number of selectable types and combinations of outdoor units, and optimumly set the sum of maximum capacities of the outdoor units in accordance with the capacity of the indoor units.

What is claimed is;

1. An air-conditioner comprising:
   a plurality of indoor units each having a refrigeration capacity, at least one of said indoor units including means for outputting a signal denoting a demanded refrigeration capacity with respect to an air conditioning area of said at least one of said indoor units;
   a plurality of outdoor units each having a compressor and a control means for driving said compressor, wherein said indoor units are connected with said outdoor units by refrigerant pipe to form a single refrigerating cycle system; and
   a control apparatus for receiving said signal from said at least one of said indoor units and for outputting a respective compressor control signal to said outdoor units, said control apparatus including means for obtaining a sum of demanded refrigeration capacities of said at least one of said indoor units based on said signal received from said at least one of said indoor units, and means for optimally distributing the thus obtained demanded capacity sum to each of said outdoor units on the basis of data representative of said outdoor units and outputting corresponding compressor control signals to said outdoor units.

2. An air-conditioner comprising:
   a plurality of indoor units each having a refrigeration capacity;
   a plurality of outdoor units each having a compressor and a control means for driving said compressor, wherein said indoor units are connected with said outdoor units by refrigerant pipe to form a single refrigerating cycle system in which a refrigerant is circulated through said refrigerant pipe to each of said indoor units; and
   a control apparatus for optimally selecting said outdoor units and setting a flow rate of said refrigerant of said outdoor units, said control apparatus including means for obtaining a sum of said refrigeration capacities of said plurality of indoor units, and means for allotting the thus obtained refrigeration capacity sum to said plurality of outdoor units according to a respective compressor capacity of each compressor of said plurality of outdoor units;

wherein each control means of each outdoor unit includes means for driving each respective compressor according to an output from said control apparatus.

3. An air-conditioner according to claim 2, wherein said control apparatus includes means for distributing zero refrigeration capacity to at least one of said outdoor units.

4. An air-conditioner according to claim 3, wherein said data representative of said outdoor units denotes a maximum refrigerating capacity for operating each of said outdoor units.

5. An air-conditioner according to claim 3, wherein said data representative of said outdoor units denotes a maximum refrigerating capacity for continuously operating each of said outdoor units.

6. An air-conditioner according to claim 3, wherein each of said outdoor units includes at least one of first type of compressor and second type of compressor, wherein said first type of compressor is switchable between a stop state and an operation state of a rated capacity, and said second type of compressor is switchable between a stop state and an operation state of a variable capacity.

7. An air-conditioner according to claim 6, wherein said data representative of said outdoor units denotes an installation of at least one of said first type of compressor and said second type of compressor.

8. An air-conditioner according to claim 7, wherein said data representative of said outdoor units further denote a maximum refrigerating capacity for operating each of said outdoor units.

9. An air-conditioner according to claim 7, wherein said data representative of said outdoor units further denotes a maximum refrigerating capacity for continuously operating each of said outdoor units.

10. An air-conditioner according to claim 6, wherein said data representative of said outdoor units denotes a range of alteration of the refrigerating capacity of each of said outdoor units.

11. An air-conditioner according to claim 2, wherein said indoor units include a variable valve for changing a circulating rate of said refrigerant, an opening rate of said variable valve being changeable in accordance with a demanded refrigerating capacity of said indoor units, and wherein said control apparatus includes means for setting a circulating rate of said refrigerant of said outdoor units so that a desired amount of said refrigerant of said outdoor unit is obtained in accordance with a sum of said opening rates of said indoor units.

* * * * *